US011535246B2

(12) United States Patent
Sherrit et al.

(10) Patent No.: US 11,535,246 B2
(45) Date of Patent: Dec. 27, 2022

(54) SYSTEMS AND METHODS FOR PROVIDING A WARNING TO AN OCCUPANT OF A VEHICLE

(71) Applicant: DENSO CORPORATION, Kariya (JP)

(72) Inventors: Nathaniel Sherrit, Canton, MI (US); Ryo Takaki, Southfield, MI (US); Joshua Goriesky, Plymouth, MI (US)

(73) Assignee: DENSO CORPORATION, Aichi (JP)

( * ) Notice: Subject to any disclaimer, the term of this patent is extended or adjusted under 35 U.S.C. 154(b) by 361 days.

(21) Appl. No.: 16/834,300

(22) Filed: Mar. 30, 2020

(65) Prior Publication Data

US 2021/0300358 A1 Sep. 30, 2021

(51) Int. Cl.
*B60W 30/095* (2012.01)
*B60Q 9/00* (2006.01)
*B60W 50/16* (2020.01)
*B60W 50/14* (2020.01)

(52) U.S. Cl.
CPC ........ *B60W 30/0956* (2013.01); *B60Q 9/008* (2013.01); *B60W 50/16* (2013.01); *B60W 2050/143* (2013.01); *B60W 2050/146* (2013.01); *B60W 2554/4026* (2020.02); *B60W 2554/4029* (2020.02); *B60W 2554/801* (2020.02)

(58) Field of Classification Search
None
See application file for complete search history.

(56) References Cited

U.S. PATENT DOCUMENTS

| 7,586,402 | B2 | 9/2009 | Bihler et al. |
| 10,000,172 | B2 | 6/2018 | Gurghian et al. |
| 10,086,833 | B1 | 10/2018 | Duan et al. |
| 10,435,920 | B2 | 10/2019 | Ganeshan et al. |
| 2007/0057780 | A1 | 3/2007 | Bridges et al. |
| 2009/0033477 | A1 | 2/2009 | Illium et al. |
| 2009/0256698 | A1* | 10/2009 | Bonilla .................. B60Q 9/008 340/479 |
| 2013/0234844 | A1 | 9/2013 | Yopp |
| 2019/0211587 | A1 | 7/2019 | Ganeshan et al. |
| 2019/0286153 | A1* | 9/2019 | Rankawat ................. G06T 7/11 |

(Continued)

FOREIGN PATENT DOCUMENTS

EP 3657382 A1 * 5/2020 ............. B60Q 9/008

*Primary Examiner* — Sze-Hon Kong
*Assistant Examiner* — Davin Seol
(74) *Attorney, Agent, or Firm* — Christopher G. Darrow; Darrow Mustafa PC

(57) ABSTRACT

A system for providing an alert to an occupant of a vehicle may include one or more processors and a memory. The memory may store a free space detection module, a target detection module, a path prediction module, an activation threshold module, and an alert module. The modules include instructions that cause the one or more processors to determine one or more dimensions of a free space located adjacent to a side of the vehicle, determine one or more dimensions of one or more targets, determine one or more predicted paths of one or more targets, selectively adjust an activation threshold for providing an alert according to the one or more predicted paths, and activate the alert to inform the occupant of a hazard associated with the one or more targets according to whether the one or more predicted paths satisfies the activation threshold.

17 Claims, 7 Drawing Sheets

(56) References Cited

U.S. PATENT DOCUMENTS

| | | | |
|---|---|---|---|
| 2020/0086876 A1* | 3/2020 | Yasunori | B60W 30/0953 |
| 2020/0114821 A1* | 4/2020 | Kim | B60Q 9/008 |
| 2020/0218979 A1* | 7/2020 | Kwon | G06N 3/08 |
| 2021/0107506 A1* | 4/2021 | Takagi | B60W 40/105 |
| 2021/0253095 A1* | 8/2021 | Jiang | B60W 30/18163 |
| 2021/0264786 A1* | 8/2021 | Tseng | G08G 1/16 |

\* cited by examiner

SYSTEMS AND METHODS FOR PROVIDING A WARNING TO AN OCCUPANT OF A VEHICLE

TECHNICAL FIELD

The subject matter described herein relates in general to systems and methods for providing warnings to occupants of a vehicle to avoid dangerous hazards when exiting the vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Vehicles may employ various safety systems to protect the occupants of the vehicle. These various safety systems may include safety systems such as airbags, active/passive restraints, automated control assistance (e.g., anti-lock braking systems (ABS)), and so on. While these systems improve the safety of the occupants, they do not generally function to improve the safety of occupants from external hazards. That is, the noted systems facilitate preventing crashes and/or protecting occupants against injury while inside the vehicle, but do not help the occupant when, for example, exiting the vehicle.

Thus, the occupant is generally left to their own intuition when exiting from the vehicle in relation to potential hazards that exist around the vehicle. Moreover, while some systems may provide warnings to occupants about nearby vehicles, such systems fail to account for various latent or delayed hazards. For example, various systems may issue alerts upon sensing a nearby vehicle. However, the systems do not consider various aspects of the environment surrounding the vehicle, such as the free space between the vehicle and an object that may prohibit the oncoming vehicle from being a hazardous concern.

SUMMARY

This section generally summarizes the disclosure and is not a comprehensive explanation of its full scope or all its features.

In one embodiment, a system for providing an alert to an occupant of a vehicle includes one or more processors and a memory in communication with the one or more processors. The memory may store a free space detection module, a target detection module, a path prediction module, an activation threshold module, and an alert module. The modules may include instructions that, when executed by the one or more processors, cause the one or more processors to perform any one of a number of different actions.

In this example, the free space detection module may cause the one or more processors to determine one or more dimensions of a free space located adjacent to a side of the vehicle based on sensor data from one or more sensors. The target detection module may cause the one or more processors to determine one or more dimensions of one or more targets based on the sensor data that are external to the vehicle. The path prediction module may cause the one or more processors to determine one or more predicted paths of one or more targets based on one or more directions of the one or more targets, one or more dimensions of the one or more targets, and one or more dimensions of the free space.

The activation threshold module may cause the one or more processors to selectively adjust an activation threshold for providing an alert according to the one or more predicted paths. The alert module may cause the one or more processors to activate the alert to inform the occupant of a hazard associated with the one or more targets according to whether the one or more predicted paths satisfies the activation threshold.

In another embodiment, a method for providing an alert to an occupant of a vehicle may include the steps of determining one or more dimensions of a free space located adjacent to a side of the vehicle, determining one or more dimensions of one or more targets, determining one or more predicted paths of one or more targets based on one or more directions of the one or more targets, one or more dimensions of the one or more targets, and one or more dimensions of the free space, selectively adjusting an activation threshold for providing an alert according to the one or more predicted paths, and activating the alert to inform the occupant of a hazard associated with the one or more targets according to whether the one or more predicted paths satisfies the activation threshold.

In yet another embodiment, a non-transitory computer-readable medium storing instructions for providing an alert to an occupant of a vehicle that, when executed by one or more processors, cause the one or more processors to determine one or more dimensions of a free space located adjacent to a side of the vehicle, determine one or more dimensions of one or more targets, determine one or more predicted paths of one or more targets based on one or more directions of the one or more targets, one or more dimensions of the one or more targets, and one or more dimensions of the free space, selectively adjust an activation threshold for providing an alert according to the one or more predicted paths, and activate the alert to inform the occupant of a hazard associated with the one or more targets according to whether the one or more predicted paths satisfies the activation threshold.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
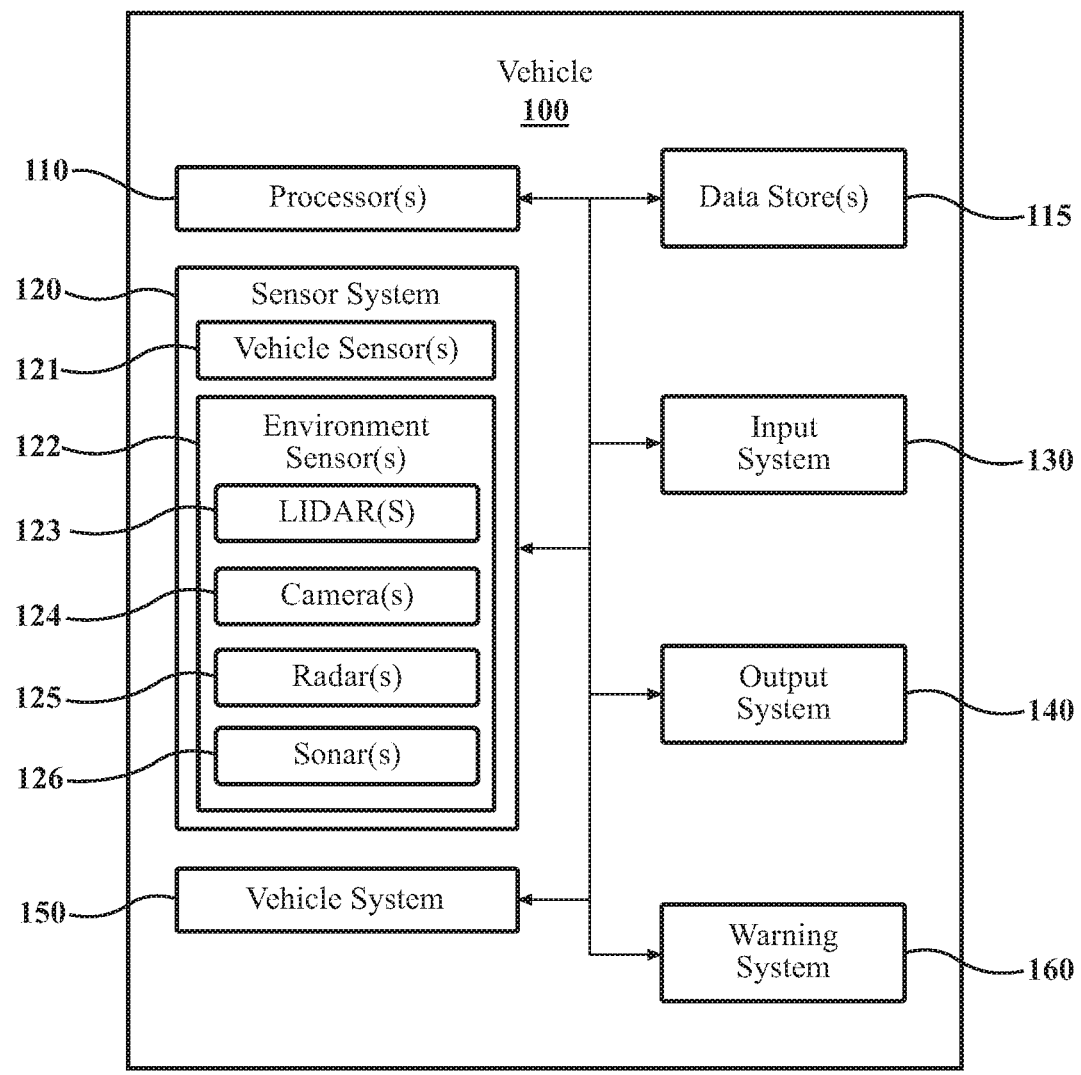
FIG. 1 illustrates one embodiment of a configuration for a vehicle in which example systems and methods disclosed herein may operate.

Systems, methods, and other embodiments associated with improving alerts to an occupant about hazards when exiting a subject vehicle are disclosed. As previously noted, external hazards, such as closely passing vehicles, may be difficult for an occupant to identify when exiting a vehicle. Moreover, circumstances where an alert system incorrectly activates an alert or fails to activate an alert for a hazard can represent further difficulties that may diminish trust in the alerting system, thereby diminishing safety overall.

In one example, a system for determining when to activate an alert to notify an occupant of a vehicle that a potential hazard exists when exiting the vehicle generally includes a processor(s) and one or more sensors disposed within a vehicle. The sensors could include a variety of different sensors that can detect objects located in the environment in which the vehicle operates. Based on information received from the sensors, the processor(s) can determine a free space located adjacent to the vehicle. The free space may be located on the side of the vehicle that includes a door. The free space may be bounded on one side by the vehicle and by the other side by another vehicle or object. Alternatively, if there is no other object, the free space may be defined as a predefined area that extends from one side of the vehicle.

The processor(s) also receives information from sensors regarding other moving objects, referred to as targets. The processor can receive information from the sensors, determine the general widths of the targets, and compare this to the width of the free space. In situations where the width of the target is greater than the width of the free space, the processor(s) may determine that the target will not enter the free space and adjust an activation threshold. The activation threshold indicates a likelihood that the target will enter the free space and present a possible hazard to an exiting occupant. Based on this adjustable threshold, the system may determine that the moving target poses no threat to an occupant exiting the vehicle and therefore does not provide any alert to the occupant on or before exiting the vehicle.

Conversely, if the processor(s) determines that the width of the free space can accommodate the width of the moving target, the processor may adjust the threshold indicating a greater likelihood that the moving target will enter into the free space and pose a potential hazard to the occupant if the occupant exits the vehicle. In this situation, the system provides an alert to the occupant of the potential hazard. As such, the system utilizes knowledge of the width of the target and the width of the free space to determine a general likelihood that the target will enter the free space and therefore be a hazardous concern to the occupant of the vehicle Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport that, for example, transports occupants, and thus benefits the functionality discussed herein. Additionally, the vehicle 100 could be an autonomous vehicle, a semi-autonomous vehicle, a nonautonomous vehicle, or combinations thereof.

The vehicle 100 also includes various elements. It will be understood that in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. For purposes of the brevity of this description, a description of many of the elements in FIG. 1 will be provided after the discussion of FIGS. 2-7. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a warning system 160 that functions to improve the safety of occupants of the vehicle 100. The occupants of the vehicle 100 could include passengers of the vehicle but could also include a driver of the vehicle 100 as well. While depicted as a standalone component, in one or more embodiments, the warning system 160 may be integrated within another component of the vehicle 100, such as a semi-autonomous, autonomous or other vehicle control system if the vehicle 100 is so equipped. The noted functions and methods will become more apparent with a further discussion of the figures.

Figure 2:
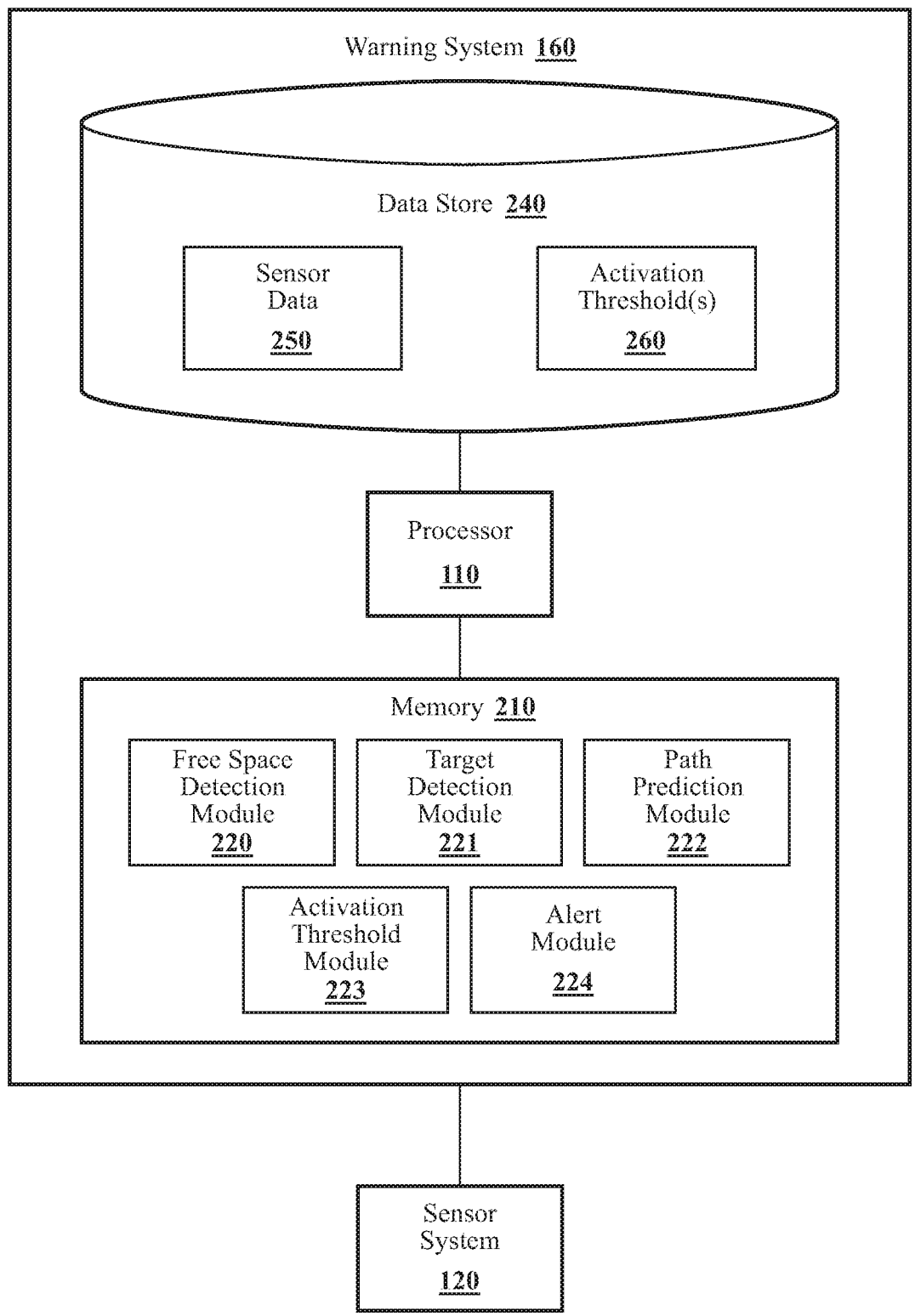
FIG. 2 illustrates one example of a system that is associated with warning an occupant about hazards when exiting a vehicle.

With reference to FIG. 2, one embodiment of the warning system 160 is further illustrated. As shown, the warning system 160 includes a processor(s) 110. Accordingly, the processor(s) 110 may be a part of the warning system 160, or the warning system 160 may access the processor(s) 110 through a data bus or another communication pathway. In one or more embodiments, the processor(s) 110 is an application-specific integrated circuit that is configured to implement functions associated with a free space detection module 220, a target detection module 221, a path prediction module 222, an activation threshold module 223, and/or an alert module 224. More generally, in one or more aspects, the processor(s) 110 is an electronic processor, such as a microprocessor that is capable of performing various functions as described herein when loading the modules 220-224 and executing encoded functions associated therewith.

In one embodiment, the warning system 160 includes a memory 210 that stores the free space detection module 220, the target detection module 221, the path prediction module 222, the activation threshold module 223, and/or the alert module 224. The memory 210 is a random-access memory (RAM), read-only memory (ROM), a hard disk drive, a flash memory, or other suitable memory for storing the modules 220 and 230. The modules 220-224 are, for example, computer-readable instructions that, when executed by the processor(s) 110, cause the processor(s) 110 to perform the various functions disclosed herein. While, in one or more embodiments, the modules 220-224 are instructions embodied in the memory 210, in further aspects, the modules 220-224 include hardware, such as processing components (e.g., controllers), circuits, etc. for independently performing one or more of the noted functions.

Furthermore, in one embodiment, the warning system 160 includes a data store 240. The data store 240 is, in one embodiment, an electronically-based data structure for storing information. In at least one approach, the data store 240 is a database that is stored in the memory 210 or another suitable medium, and that is configured with routines that can be executed by the processor(s) 110 for analyzing stored data, providing stored data, organizing stored data, and so on. In either case, in one embodiment, the data store 240 stores data used by the modules 220-224 in executing various functions. In one embodiment, the data store 240 includes sensor data 250, and activation threshold(s) 260 (e.g., activation zone, timing thresholds, defined free space, etc.) along with, for example, other information that is used by and/or produced by the modules 220-224.

Accordingly, the free space detection module 220 generally includes instructions that function to control the processor(s) 110 to acquire data inputs from one or more sensors, such as the sensors making up the sensor system 120 and more particularly the environment sensors 122 that can detect objects located within the environment that the vehicle 100 is operating within. The sensors making up the environment sensors 122 can include any one of a number of different sensors. In one example, the sensors could include LIDAR sensor(s) 123, camera(s) 124, radar sensor(s) 125, and/or sonar sensor(s) 126.

Figure 3A:
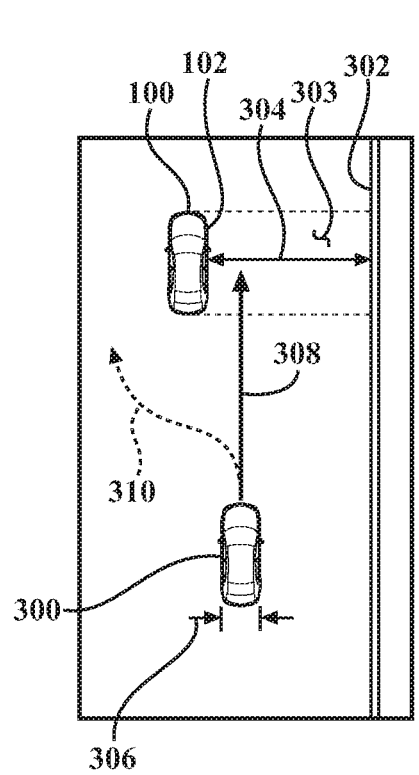
FIGS. 3A-3C and 4-6 illustrate different scenarios for determining when to activate the warning system.
Figure 3B:
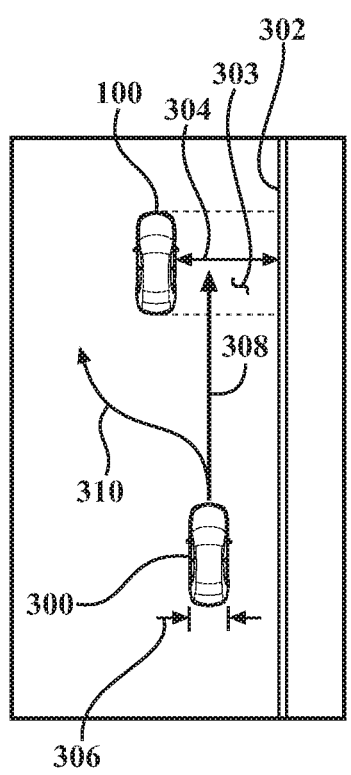
Figure 3C:
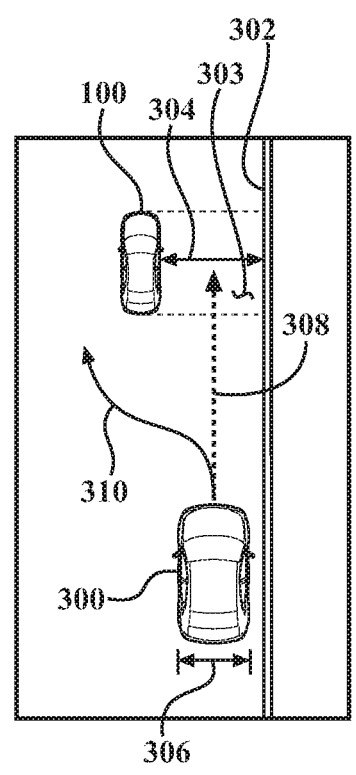
Figure 4:
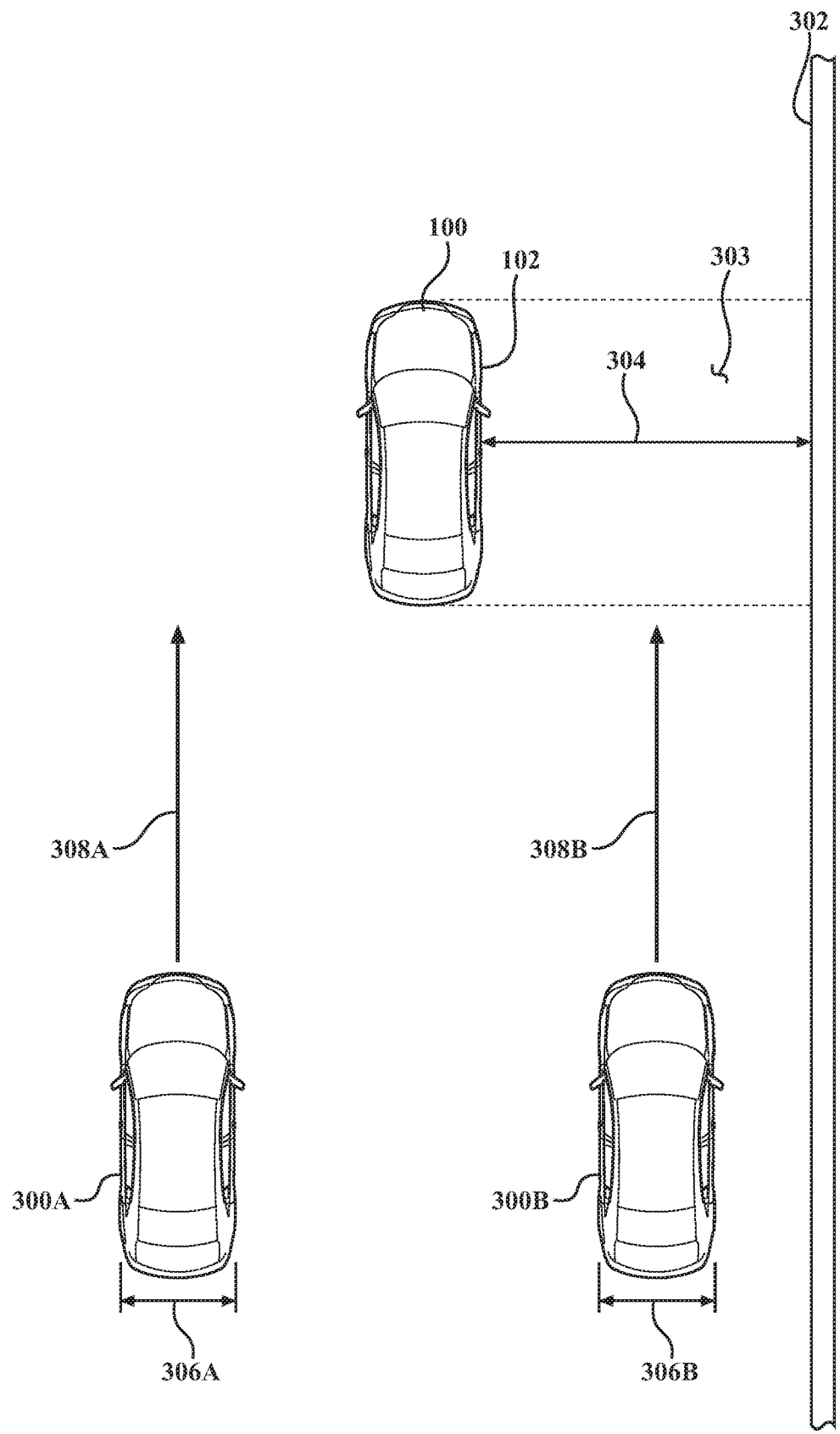
Figure 5:
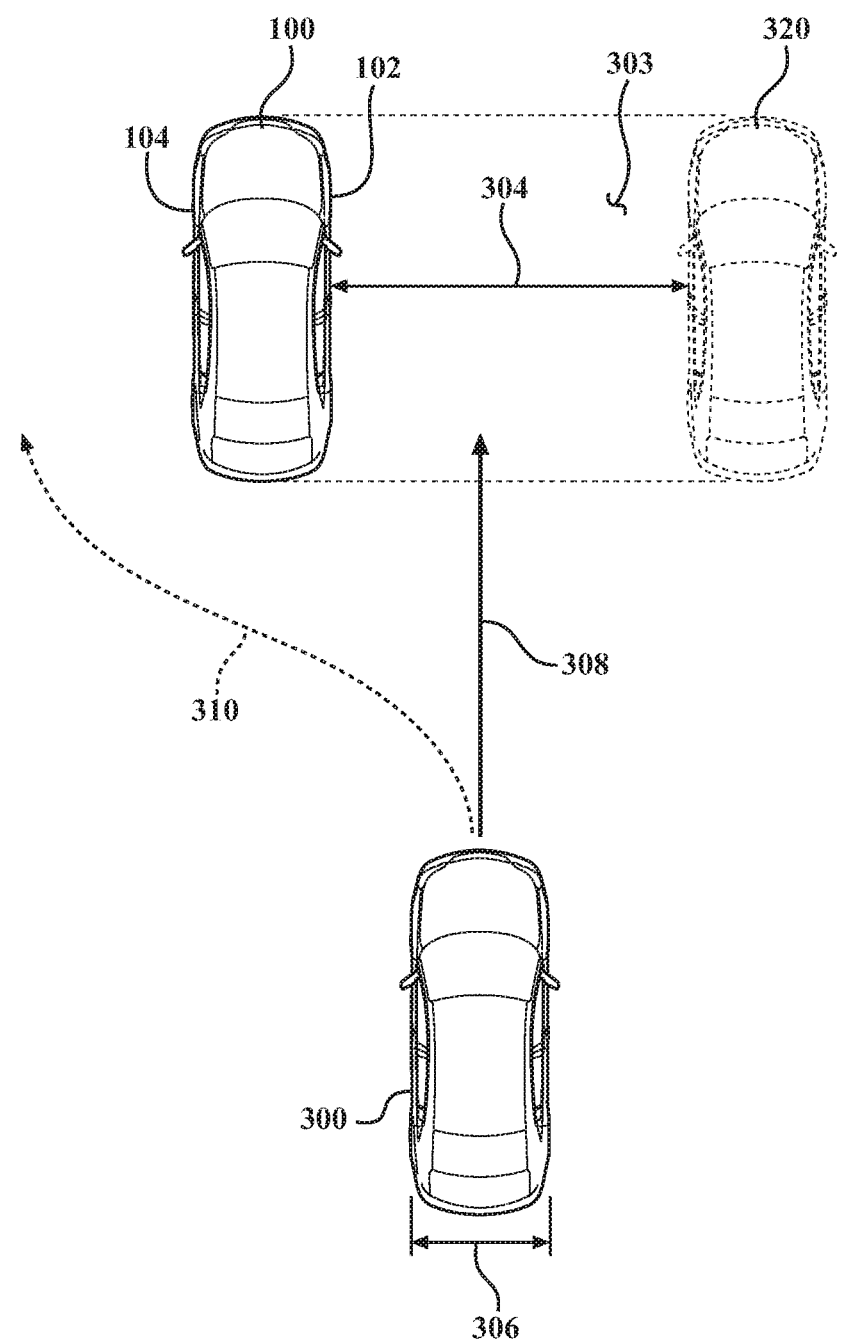

Upon receiving information from the environment sensors 122, the free space detection module 220 may cause the processor(s) 110 to determine one or more dimensions of a free space located adjacent to a side of the vehicle 100 based on sensor data from one or more environment sensors 122. Moreover, in order to better visualize what is meant by free space, reference is made to FIGS. 3A-3C and 4-6. In FIGS. 3A-3C, a free space 303 is located adjacent to a side 102 of the vehicle 100. Here, the free space 303 may have a width 304. The free space 303 in these examples may be an area that is bounded on one side by the side 102 of the vehicle 100 and the other side by an object 302. The object 302 may be a moving object, such as the vehicle 320 shown in FIG. 5, or may be a static object such as shown in FIG. 3A-3C. As such, the object 302 could be a wall, curb, building, sign, and the like. Similarly, the object 302 could be a moving object, such as another vehicle, pedestrian, scooter, motorcycle, bicyclists, and the like. The moving object may be actively moving or may be parked. Again, it should be understood that the object 302 could be any static or dynamic object.

Further, the free space detection module 220 may bound the free space on one side by side 102 of the vehicle 100 and then bound the other side of this free space 303 at a distance. For example, referring to FIG. 6, here the free space 303 is defined on one side by the side 102 of the vehicle 100 but on the other side based on a distance that may be equal to the distance of the width 304 of the free space 303.

As such, the free space detection module 220 generally determines a free space 303 that has one side bounded by the side 102 of the vehicle 100 and another side bounded by an object or some set distance from the side 102 of the vehicle 100. The free space 303 may also be bounded using the front and rear of the vehicle 100 so as to create a box defined by a line extending from the front of the vehicle 100 to the object 302, another line extending from the rear of the vehicle 100 to the object 302 and then two substantially parallel lines defined by the side 102 of the vehicle 100 and the object 302 to define a box that defines the free space 303. However, it should be understood that any one of a number of different methodologies could be utilized to define the free space 303. In addition, it should be understood the free space 303 does not necessarily need to be a rectangular shape, as shown, but could be any shape. Furthermore, the free space 303 does not necessarily need to be a two-dimensional free space, as shown, but could be a three-dimensional free space.

Figure 6:
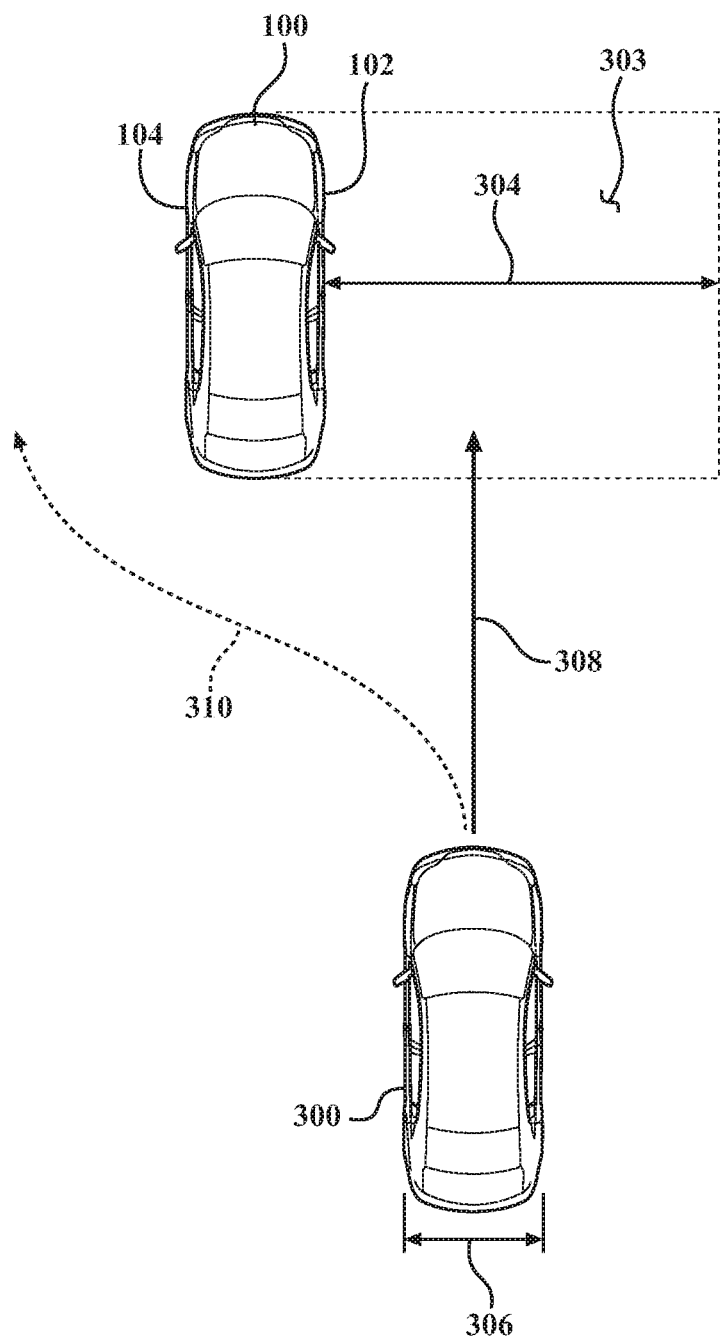

The free space detection module 220 may cause the processor(s) 110 to determine one or more dimensions of the free space 303. In one example, the one or more dimensions of this free space 303 may be a width 304 of this free space 303. The width 304 may be defined as the distance between the side 102 of the vehicle 100 and the object 302 or some set distance, such as shown in FIG. 6. As will be explained in greater detail later in this disclosure, the width 304 of the free space 303 can be utilized to determine the likelihood that a target 300 will travel through the free space 303 potentially becoming a hazard to an occupant when the occupant exits the vehicle 100.

The target detection module 221 generally includes instructions that function to control the processor(s) 110 to acquire data inputs from one or more sensors (e.g., the sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, targets (e.g., dynamic objects), static objects, obstacles, and other aspects of the environment that may be present in lanes, proximate to a roadway, within a parking lot, garage structure, driveway, or another area within which the vehicle 100 is traveling and/or parked.

While the target detection module 221 is discussed as controlling the various sensors to provide the sensor data 250, in one or more embodiments, the free space detection module 220 can employ other techniques to acquire the sensor data 250 that are either active or passive. For example, the free space detection module 220 may passively sniff the sensor data 250 from a stream of electronic information provided by the various sensors to further components within the vehicle 100. Moreover, the free space detection module 220 can undertake various approaches to fuse data from multiple sensors, from a wireless communication link (e.g., v2v) with one or more surrounding vehicles, and/or from one or more infrastructure-based sensors (e.g., vehicle-to-infrastructure). Thus, the sensor data 250, in one embodiment, represents a combination of perceptions acquired from multiple sensors and/or sources.

In addition to locations of the surrounding target(s) 300, the sensor data 250 may also include, for example, information about lane markings, velocities of surrounding target(s) 300, positions, and so on. Moreover, the target detection module 221, in one embodiment, controls the sensors to acquire the sensor data 250 about an area that encompasses 360 degrees about the vehicle 100 in order to provide a comprehensive assessment of the surrounding environment. Accordingly, the sensor data 250 may include varying forms of observations about the surrounding environment that the free space detection module 220 derives from a single type of sensor (e.g., a radar sensor) or that the free space detection module 220 derives from fusing sensor data from multiple sources, such as LIDAR sensor(s) 123, camera(s) 124, radar sensor(s) 125, and/or sonar sensor(s)

126 of FIG. 1. In any case, the sensor data 250 provides observations of the surrounding environment to support the detection, identification, and localization of the target(s) 300, and, in at least one embodiment, aspects of the environment that may influence paths/trajectories of the target(s) 300.

Thus, the target detection module 221 processes the sensor data 250 to detect the surrounding objects and track particular ones of the objects as target(s) 300 (e.g., objects traveling in a lane adjacent to the vehicle 100). As previously noted, the target(s) 300 include dynamic objects, such as various types of vehicular objects (e.g., automobiles, trucks, motorcycles, etc.), non-vehicular objects (e.g., pedestrians, animals, bicycles, etc.), etc. Whichever objects makeup the detected target(s) 300, the warning system 160 generally functions to determine hazards to an occupant that may exit via one of the doors of the vehicle 100 and provide the alerts for the hazards.

Moreover, while the present disclosure generally describes the warning system 160 within the context of detecting a single target 300, and providing the alert in relation to the target 300, it should be appreciated that the warning system 160 may detect and provide alerts for any number of target(s) 300 in a surrounding environment. For example, in various examples, the warning system 160 may detect two, three, four, or more target(s) 300, including vehicles and other types of dynamic objects.

In any case, the target detection module 221, as noted, generally functions to detect a target and determine the characteristics of the targets from the sensor data 250. The characteristics generally the direction, the speed, in one or more dimensions of the target(s) 300. For example, the one or more dimensions of the target(s) 300 could include the widths of the target(s) 300. As will be explained later, the widths of the target(s) 300, as well as the width 304 of the free space 303 will be utilized to determine the likelihood that the target(s) 300 will enter the free space 303 and pose a potential hazard to an occupant when/if the occupant exits the vehicle 100

The path prediction module 222 may include instructions that when executed by the one or more processor(s) 110 cause the one or more processor(s) 110 to determine one or more predicted paths of one or more target(s) 300 based on one or more directions of the one or more target(s) 300, one or more dimensions of the target(s) 300, and one or more dimensions of the free space 303. The one or more dimensions of the target(s) 300 may include the width 306 of the target 300. The one or more dimensions of the free space 303 may include the width of 304 of the free space 303.

For example, the path prediction module may determine that the width 304 for the free space 303 is such that the target(s) 300 can fit within the width 304 of the free space 303. For example, referring to FIGS. 3A-3B, these figures illustrate that the width 306 of the target 300 is less than the width 304 of the free space 303 raising the possibility that the target 300 will enter the free space 303, as the target 300 can fit within the width 304 of the free space 303. Conversely, referring to FIG. 3C, this figure illustrates a scenario wherein the width 306 of the target 300 is greater than the width 304 of the free space 303, making it essentially impossible or extremely difficult for the target 300 to travel through the free space 303. In such a situation, the path prediction module 222 may determine that the target 300 is most likely to execute a path that will not cause it to go through the free space 303.

Referring back to the scenario shown in FIG. 3A, the path prediction module 222 has determined a first path 308 and a second path 310 that the target 300 may utilize. In this example, because of the width 304 of the free space 303 is fairly large and can easily accommodate the target 300, the path prediction module 222 may determine that there is a greater likelihood that the target 300 will enter into the free space 303 by following the path 308, instead of avoiding the free space 303 by following the path 310.

Referring to FIG. 3B, in this scenario, the width 304 of the free space 303 can accommodate the width 306 of the target 300. However, the path prediction module 222 may determine that because the width 304 is less than the width 304 of FIG. 3A, the path prediction module 222 may determine that the target 300 is more likely to follow the predicted path 310 as opposed to the predicted path 308 because, as the distance of the width 304 of the free space 303 becomes less and less, the path prediction module 222 may make a determination that the target 300 is more likely to follow a path, such as the path 310 that avoids any close calls with hitting either the vehicle 100 or the object 302, as the width 304 of the free space 303 decreases.

In FIG. 3C, the width 306 of the target 300 and the width 304 of the free space 303 is such that the target 300 may not be able to pass through this free space 303 without damaging the target 300, the vehicle 100 and/or the object 302. In this situation, the path prediction module 222 may decide that the target 300 will not follow the path 310 and will instead follow the path 308.

As such, as the width 304 of the free space 303 decreases and/or the width 306 of the target 200 increases, the likelihood that the target 300 will enter the free space 303 decreases. A number of different other variables can also be utilized in determining the path that the target 300 will travel, and not necessarily be limited just to the width 306 of the target 300 and the width 304 of the free space 303. For example, if the target 300 is traveling slowly, the path prediction module 222 may determine that there is an increased probability that the target 300 will enter the free space 303 because the target 300 is traveling at a slower speed indicating that the target 300 may be piloted in a more careful manner increasing the likelihood that the target 300 will enter the free space, even though the width 304 of the free space 303 is only slightly larger than the width 306 of the target 300.

In addition to speed of the target 300, other factors can be utilized, such as the presence of other targets that may prohibit or limit the movement of the target 300. For example, referring to FIG. 4, two targets 300A and 300B are shown. Each of the targets 300A and 300B have widths 306A and 306B, respectively. In this situation, the predicted path 308A of the target 300A may affect the predicted path 308B of the vehicle 300B. Moreover, because both targets 300A and 300B are traveling parallel to each other, one vehicle, such as vehicle 300B, is less likely to cross over and collide with target 300A in order to avoid the free space 303. In this situation, even though the width 304 of the free space 303 has decreased, the presence of the target 300A impacts the path 308B that the vehicle 300B will take.

The activation threshold module 223 may include instructions that, when executed by the processor(s) 110, may cause the processor(s) 110 to selectively adjust an activation threshold for providing an alert according to the one or more predicted paths determined by the path prediction module 222. In this situation, the activation threshold module 223 may determine the likelihood that the target(s) 300 will enter into the free space 303. As stated before, the path prediction module 222 may make a number of different predictions based on the speed of the target 300, as well as other factors, such as the width 306 of the target 300 with respect to the width 304 of the free space 303, and other factors such as the presence of other targets, such as explained and shown in FIG. 4. As explained previously, as the width 304 of the free space 303 becomes smaller and smaller and/or the width 306 of the target 300 becomes wider, the probability that the target 300 will enter the free space 303 becomes less and less. However, the prediction of the path is not necessarily based entirely on these widths and may change based on a number of different factors.

As such, based on these predictions of the different paths taken by the target 300, the activation threshold module 223 essentially adjusts the threshold indicating the likelihood that the target 300 will enter into the free space 303. As the likelihood increases, the threshold may be selectively adjusted upward. In like manner, as the likelihood decreases, the threshold may be selectively adjusted downward. It should be understood that "upward" and "downward" are relative terms and may be reversed.

The alert module 224 may include instructions that, when executed by the processor(s) 110, cause the processor(s) 110 to activate an alert to inform the occupant of a hazard associated with the target according to whether the one or more predicted paths satisfies the activation threshold. In one example, the alert module 224 may determine whether the target path satisfies the activation threshold in relation to a particular door or side 102 of the vehicle 100. That is, as a further aspect, the alert module 224 monitors the doors of the vehicle 100 to determine which door is potentially associated with an exiting occupant and compares the target path with the activation threshold in relation to a side 102 of the vehicle 100 for the door. In one aspect, the sensor data 250 can further include information about an interior of the vehicle 100, such as, seat occupancy sensors, door sensors, seat belt sensors, and other information that provides insights about which door an occupant is likely to exit.

Thus, in one embodiment, when the warning system 160 detects that the vehicle 100 stops, and that a seat belt is unbuckled and/or a door handle is activated, the alert module 224 then generates an alert for a corresponding side/door of the vehicle 100, if conditions for providing an alert are met (e.g., a target is within the activation threshold). In a further aspect, the alert module 224 may provide an alert whenever a hazard is present, and the vehicle 100 is stopped without consideration to aspects relating specifically to the occupant (e.g., seat belt sensor, etc.). It should be appreciated that such an alert is generally not delivered when the vehicle 100 is in motion, although, in various embodiments, a similar mechanism may be employed for collision avoidance detection.

In any case, the alert module 224, in one approach, determines whether a target satisfies the activation threshold. In one or more approaches, the alert module 224 generates the alert itself in different forms when the activation threshold is satisfied. In one embodiment, the alert module 224 generates the alert as an audible indicator (i.e., a sound). In further approaches, the alert module 224 generates the alert as a visual indicator (e.g., a warning light positioned near or on doors of the vehicle 100). In yet further approaches, the alert module 224 may generate haptic feedback, lock a door, or perform other functions to provide the alert. Moreover, the alert module 224 can combine one or more different forms of the alert together, and/or generate the alert, for example, only upon sensing that an occupant is about to exit the vehicle 100 (e.g., from seat belt sensors, door sensors, etc.).

Additionally, the alert module 224 adapt a form of the alert itself. For example, the activation threshold indicates a time for which the alert remains active (e.g., a time that a light is on or a sound is played). The alert module 224 may adapt an intensity (e.g., brightness, sound level, etc.) as a hazard nears. In this way, the warning system 160 functions to selectively adjust thresholds and activate alerts according to the thresholds in order to improve safety for occupants exiting the vehicle 100 regardless of a particular form of the target path itself.

Additionally, it should be appreciated that the warning system 160 from FIG. 1 can be configured in various arrangements with separate integrated circuits and/or electronic chips. In such embodiments, the modules 220-224 may be embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220-224 may be combined into a separate application-specific integrated circuit. In further embodiments, portions of the functionality associated with the modules 220-224 may be embodied as firmware executable by a processor and stored in a non-transitory memory. In still further embodiments, the modules 220-224 are integrated as hardware components of the processor(s) 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

Figure 7:
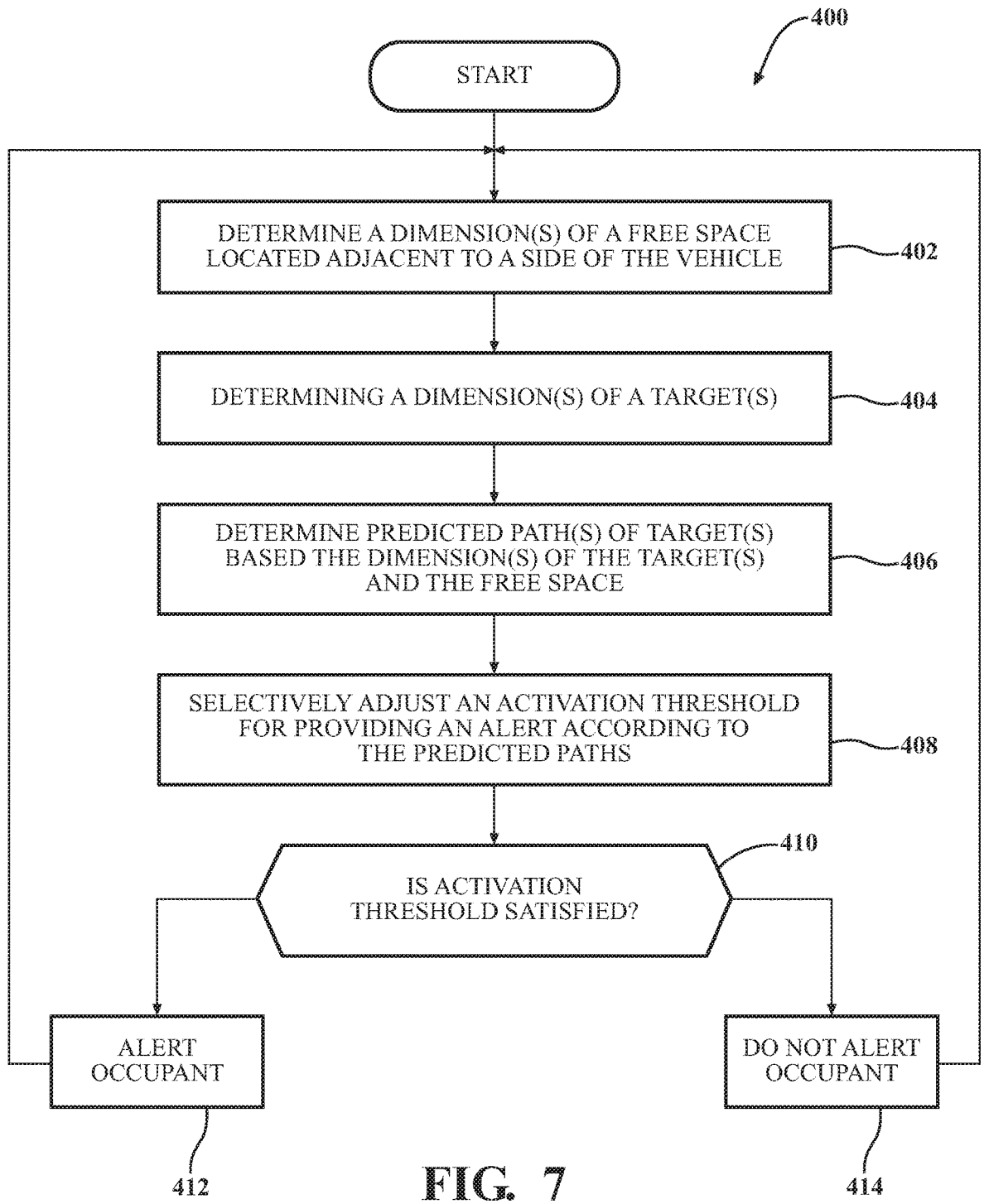
FIG. 7 illustrates a method for providing a warning to an occupant of a vehicle.

For example, FIG. 7 illustrates a method 400 for providing an alert to an occupant of a vehicle that wishes to exit the vehicle. The method 400 will be described from the viewpoint of the vehicle 100 of FIG. 1 and the warning system 160 of FIG. 2. However, it should be understood that the method 400 may be adapted to be executed in any one of a number of different situations and not necessarily the vehicle 100 of FIG. 1 and/or the warning system 160 of FIG. 2.

The method 400 begins at step 402, wherein the free space detection module 220 causes the processor(s) 110 to determine one or more dimensions of a free space, such as free space 303 located adjacent to the side 102 of the vehicle 100. As stated previously, the free space detection module 220 may cause the processor(s) 110 to collect sensor data from one or more environment sensors 122. Based on the sensor data, the free space detection module 220 may cause the processor(s) 110 to identify a free space, such as the free space 303. The free space 303 may be bounded by one or more sides of the vehicle 100 and an object, such as a target, a wall, a curb, the building, and the like. The target can be a moving target, such as a vehicle bicycle motorcycle scooter pedestrian and the like. The target does not necessarily need to be moving. Alternatively, the free space may be defined by a set distance from the side of the vehicle. As such, as shown in FIG. 6, the free space 303 may be bounded on one side by the side 102 of the vehicle 100 and may be a set distance is indicated by the width 304.

The free space detection module 220 may cause the processor(s) 110 based on sensor data to determine one or more dimensions of the free space. In one example, one or more dimensions of the free space to be determined by the free space detection module 220 is a width 304 of the free space 303. The width 304 of the free space 303 may be a distance between a side 102 of the vehicle 100 and another object or some set distance, such as shown in FIG. 6. The width 304 may be, in one example, the distance between the side of the vehicle 100 and an object or some set distance.

In step 404, the target detection module 221 can detect and determine one or more dimensions of one or more targets. As is explained previously, the targets can include any one of a number of different targets, such as other vehicles, motorcycles, bicycles, scooters, pedestrians, and the like. The targets do not necessarily need to be moving but generally have the ability to move. Here, the target detection module 221 may determine the overall width of the target. As will expanding explain later, the width of the target plays a role in determining if the target will enter the free space.

In step 406, the path prediction module 222 determines one or more predicted paths of one or more targets based on one or more dimensions of the one or more targets and one or more dimensions of the free space. For example, the target detection module 221 may determine the widths of one or more targets, while the free space detection module may determine the width of the free space. The path prediction module 222 may cause the processor to determine the overall likelihood that one or more the targets will choose a path that leads the target into the free space. This likelihood, which may be viewed as a threshold, can be based on the width of the target as well as the width of the free space. So, for example, if the target has a width that is greater than the free space, the target is unlikely to enter the free space because doing so may cause damage to the target. Conversely, if the width of the free space can accommodate the width of the target, the threshold may be adjusted to indicate that the target is more likely to enter the free space.

In addition to looking at the widths of the target and/or the free space, other factors could also be utilized, such as the speed of the target and the presence of other targets that may impact the predicted path of the target. For example, a target that is moving very slowly may be more likely to enter into the free space even though the width of the free space may be relatively tight compared to the width of the target. Additionally or alternatively, the presence of other targets may essentially make it highly unlikely that the target will avoid the free space, as, in one example, by so doing, the target would have to collide with another target in order to avoid entering the free space. In such a situation, the target is most likely to enter the free space instead of colliding with another target.

In step 408, the activation threshold module 223 causes the processor(s) 110 to adjust an activation threshold based on the predicted paths of the target and the likelihood that the target will follow one of the predicted paths into the free space. Essentially, the free space is an area that, if an occupant exits the vehicle 100 and the target answers the free space, the chance of a collision or near collision could occur. The activation threshold module 223 adjusts the threshold to indicate the likelihood that such a collision will occur if the occupant exits the vehicle into the free space. This activation threshold may be increased if the activation threshold module 223 indicates or receives information an occupant is exiting the vehicle into the free space.

In step 410, the alert module 224 determines if an activation threshold is satisfied. If the activation threshold is satisfied, the alert module 224 causes the processor(s) 110 to alert the occupant. As shown in step 412. The alert provided to the occupant can be any one of a number of different alerts such as audible alerts, visual alerts, haptic feedback alerts, and the like. If the threshold is not satisfied, the method 400 moves to step 414, where no alert is provided to the occupant. Thereafter steps 412 and/or 414, the method 400 may start again or may terminate.

While for purposes of simplicity of explanation, the illustrated methodologies in the figures are shown and described as a series of blocks, it is to be appreciated that the methodologies (e.g., method 400 of FIG. 7) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the warning system 160 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

The one or more data stores 115 (e.g., data store 240) can include sensor data (e.g., sensor data 250). In this context, "sensor data" means any information from the sensors that the vehicle 100 is equipped with, including the capabilities and other information about such sensors. As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data stores 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the sensor system 120 can include sensors throughout an occupant compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described. As an example, in one or more arrangements, the sensor system 120 can include one or more radar sensor(s) 125, one or more LIDAR sensor(s) 123, one or more sonar sensor(s) 126, and/or one or more camera(s) 124. In one or more arrangements, the one or more camera(s) 124 can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle occupant (e.g., an operator or a passenger). The vehicle 100 can include an output system 140. An "output system" includes any device, component, or arrangement or groups thereof that enable information/data to be presented to a vehicle occupant (e.g., a person, a vehicle passenger, etc.).

The vehicle 100 can include one or more various vehicle systems 150. The vehicle 100 can include various combinations of systems. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system, or a geolocation system.

The processor(s) 110 and/or the warning system 160 can be operatively connected to communicate with the various vehicle systems 150 and/or individual components thereof. For example, returning to FIG. 1, the processor(s) 110 and/or the warning system 160 can be in communication to send and/or receive information from the various vehicle systems 150 to control the movement, speed, maneuvering, heading, direction, etc. of the vehicle 100. The processor(s) 110 and/or the warning system 160 may control some or all of these various vehicle systems 150 and, thus, may be partially or fully autonomous. The processor(s) 110 and/or the warning system 160 can be operatively connected to communicate with the various vehicle systems 150 and/or individual components thereof.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, one or more data stores 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, other magnetic media, an ASIC, a CD, other optical media, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discreet logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for providing an alert to an occupant of a vehicle, the system comprising:
    one or more processors; and
    a memory in communication with the one or more processors and storing:
        a free space detection module including instructions that when executed by the one or more processors cause the one or more processors to determine one or more dimensions of a free space located adjacent to a side of the vehicle based on sensor data from one or more sensors,
        a target detection module including instructions that when executed by the one or more processors cause the one or more processors to determine one or more dimensions of one or more targets based on the sensor data, the one or more targets being external to the vehicle,
        a path prediction module that when executed by the one or more processors cause the one or more processors to determine one or more predicted paths of one or more targets based on one or more directions of the one or more targets, one or more dimensions of the one or more targets, and one or more dimensions of the free space,
        an activation threshold module including instructions that when executed by the one or more processors cause the one or more processors to selectively adjust an activation threshold for providing an alert according to the one or more predicted paths and on a probability that one or more targets will enter the free space adjacent to the side of the vehicle, and
        an alert module including instructions that when executed by the one or more processors cause the one or more processors to activate the alert to inform the occupant of a hazard associated with the one or more targets according to whether the one or more predicted paths satisfies the activation threshold.

2. The system of claim 1, wherein the path prediction module further includes instructions that when executed by the one or more processors cause the one or more processors to generate a comparison between one or more widths of the one or more targets and a width of the free space.

3. The system of claim 2, wherein the path prediction module further includes instructions that when executed by the one or more processors cause the one or more processors to selectively adjust the one or more predicted paths of the one or more targets based on the comparison between the one or more widths of the one or more targets and the width of the free space.

4. The system of claim 1, wherein the one or more targets includes one or more of: a nearby vehicle, a pedestrian, a motorcycle, a scooter, and a bicycle.

5. The system of claim 1, wherein the alert is one or more of: an audible sound, visual indicator, a haptic feedback, and a locking a door of the vehicle.

6. The system of claim 1, wherein the free space is a space between the side of the vehicle and at and one or more external objects.

7. The system of claim 6, wherein the one or more external objects includes one or more of: a wall, another vehicle, a road barrier, and a road curb.

8. A method for providing an alert to an occupant of a vehicle, the method comprising the steps of:
    determining one or more dimensions of a free space located adjacent to a side of the vehicle based on sensor data from one or more sensors;
    determining one or more dimensions of one or more targets based on the sensor data, the one or more targets being external to the vehicle;
    determining one or more predicted paths of the one or more targets based on one or more directions of the one or more targets, one or more dimensions of the one or more targets, and one or more dimensions of the free space;
    selectively adjusting an activation threshold for providing an alert according to the one or more predicted paths and on a probability that one or more targets will enter the free space adjacent to the side of the vehicle; and
    activating the alert to inform the occupant of a hazard associated with the one or more targets when the one or more predicted paths satisfies the activation threshold.

9. The method of claim 8, further comprising the step of generating a comparison between one or more widths of the one or more targets and a width of the free space.

10. The method of claim 9, further comprising the step of selectively adjusting the one or more predicted paths of the one or more targets based on the comparison between the one or more widths of the one or more targets and the width of the free space.

11. The method of claim 8, wherein activating the alert includes one or more of generating an audible sound, displaying a visual indicator, providing haptic feedback, and locking a door of the vehicle.

12. The method of claim 8, wherein the one or more targets includes one or more of: a nearby vehicle, a pedestrian, a motorcycle, a scooter, and a bicycle.

13. The method of claim 8, wherein external objects includes one or more of: a wall, another vehicle, a road barrier, and a road curb.

14. The method of claim 8, wherein the free space is a space between the side of the vehicle and at and one or more external objects.

15. The method of claim 14, wherein the one or more external objects includes one or more of: a wall, another vehicle, a road barrier, and a road curb.

16. A non-transitory computer-readable medium storing instructions for providing an alert to an occupant of a vehicle that, when executed by one or more processors, cause the one or more processors to:

determine one or more dimensions of a free space located adjacent to a side of the vehicle based on sensor data from one or more sensors;

determine one or more dimensions of one or more targets based on the sensor data, the one or more targets being external to the vehicle;

determine one or more predicted paths of one or more targets based on one or more directions of the one or more targets, one or more dimensions of the one or more targets, and one or more dimensions of the free space;

selectively adjust an activation threshold for providing an alert according to the one or more predicted paths and on a probability that one or more targets will enter the free space adjacent to the side of the vehicle; and activate the alert to inform the occupant of a hazard associated with the one or more targets according to whether the one or more predicted paths satisfies the activation threshold.

17. The non-transitory computer-readable medium of claim 16, further comprising instructions that, when executed by one or more processors, cause the one or more processors to:

generate a comparison between one or more widths of the one or more targets and a width of the free space; and adjust the one or more predicted paths of the one or more targets based on the comparison between the one or more widths of the one or more targets and the width of the free space.

* * * * *